United States Patent [19]

Yamamoto et al.

[11] Patent Number: 4,598,900
[45] Date of Patent: Jul. 8, 1986

[54] FRP LEAF SPRING SUSPENSION

[75] Inventors: Masami Yamamoto; Kenichi Sekiyama, both of Toyota; Kiyoaki Kuwayama, Nagoya, all of Japan

[73] Assignee: Toyota Jidosha Kabushiki Kaisha, Aichi, Japan

[21] Appl. No.: 623,938

[22] Filed: Jun. 25, 1984

[51] Int. Cl.⁴ .............................................. F16F 1/30
[52] U.S. Cl. ..................................... 267/52; 267/149
[58] Field of Search .................... 188/47, 48, 49, 53, 188/52, 148, 149; 280/718, 719, 720, 669

[56] References Cited

U.S. PATENT DOCUMENTS

| | | | |
|---|---|---|---|
| 1,186,393 | 6/1916 | Hagemann | 267/53 |
| 3,061,301 | 10/1962 | Bajer et al. | 267/52 |
| 3,250,546 | 5/1966 | Allison | 267/52 |
| 3,377,060 | 4/1968 | Sherwood | 267/47 |

FOREIGN PATENT DOCUMENTS 0141944 12/1979 Japan ................................. 267/149

Primary Examiner—Bruce H. Stoner, Jr.
Assistant Examiner—Alvin Oberley
Attorney, Agent, or Firm—Parkhurst & Oliff

[57] ABSTRACT

The invention relates to a FRP leaf spring suspension for an automobile including a FRP leaf spring body interposed between a hat-shaped retainer having flanges at its free ends and a U bolt seat having opposed flanges through a rubber pad at its longitudinally central portion. The FRP leaf spring body is fixed through a spring seat to an axle housing by a U bolt passing through mating holes formed in flanges of the retainer and the U bolt seat. A reinforcing fiber impregnated with resin is wound around a central portion of the FRP leaf spring body and is fixed thereto to form unevenness on a surface of the FRP leaf spring body, thereby distributing frictional force between the FRP leaf spring body and the rubber pad uniformly on the frictional contact surface of the FRP leaf spring body, and preventing stress concentration from being generated in the FRP leaf spring body. In another mode, there are formed each unevenness on an upper and a lower surface of the central portion of the FRP leaf spring body, a lower surface of the retainer, and an upper surface of the U bolt seat, thereby preventing stress concentration from being generated in the FRP leaf spring body.

3 Claims, 11 Drawing Figures

FRP LEAF SPRING SUSPENSION

BACKGROUND OF THE INVENTION

This invention relates to a suspension device of a leaf spring type for an automobile, and more particularly to a FRP (fiber reinforced plastics) leaf spring.

Conventionally, an automotive suspension device using a leaf spring includes a metal center pin 20 at a longitudinally central portion of a leaf spring 12 as shown in FIG. 6, so as to ensure center positioning and prevent forward and rearward movements of the leaf spring body due to a forward and a rearward force acting thereon upon installation of the leaf spring to an axle housing 21. Another suspension device using a FRP leaf spring for purposes of lightening of weight includes the center pin embedded into the leaf spring upon molding thereof, or inserted into a through-hole formed through the leaf spring after molding thereof, in the same manner as with the suspension device using a metal leaf spring. In another way, as shown in FIG. 10, two center pins 70 having flanges 70a are bonded at the flange sides to an upper and a lower surface of a leaf spring 62. However, as strength of the FRP leaf spring is smaller than that of a steel spring, fatigue life of the FRP leaf spring is disadvantageously decreased because of the forward and the rearward force applied to the FRP leaf spring, and stress concentration at the portion of the FRP leaf spring around the center pin which stress concentration is created by up-and-down motion of the leaf spring.

SUMMARY OF THE INVENTION

Accordingly, it is an object of the present invention to provide a FRP leaf spring suspension which may prevent stress concentration at the portion of the FRP leaf spring body around the center pin, and may have a long life.

According to the present invention, a FRP leaf spring suspension for an automobile include a FRP leaf spring body surrounded tightly by a rubber pad and interposed between a retainer and a U bolt seat through the rubber pad at its longitudinal portion, the FRP leaf spring body being in frictional contact with said rubber pad and being fixed through a spring seat disposed on an upper side of said retainer to an axle housing of a vehicular body by a U bolt passing through mating holes formed in flanges of the retainer and the U bolt seat. A reinforcing fiber impregnated with resin is wound around a central portion of the FRP leaf spring body for forming longitudinal unevenness on a surface of the FRP leaf spring body. In another mode of the invention, there is formed each unevenness on an upper and a lower surface of the central portion of the FRP leaf spring body, a lower surface of the retainer, and an upper surface of the U bolt seat.

BRIEF DESCRIPTION OF THE DRAWINGS

Various general and specific objects, advantages and aspects of the invention will become apparent when reference is made to the following detailed description of the invention considered in conjunction with the related accompanying drawings, wherein.

DETAILED DESCRIPTION OF THE PREFERRED EMBODIMENTS

Figure 1:
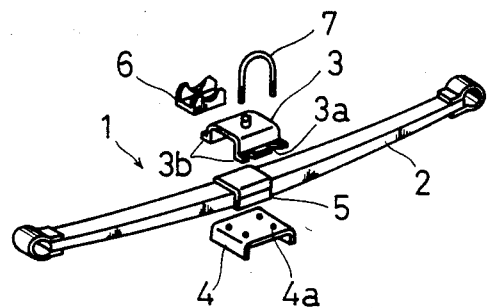
FIG. 1 is a perspective view of the FRP leaf spring suspension with each component disengaged, according to an embodiment of the present invention.
Figure 2:
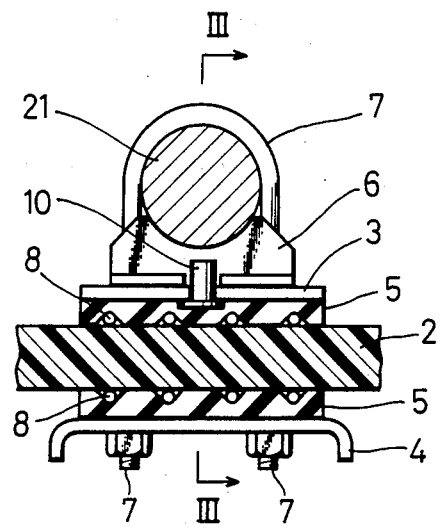
FIG. 2 is a longitudinally sectional view of a central portion of the FRP leaf spring suspension.
Figure 3:
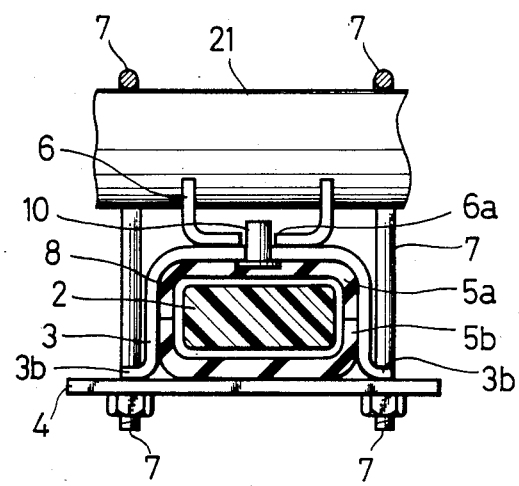
FIG. 3 is a sectional view taken along the line III—III of FIG. 2.
Figure 4:
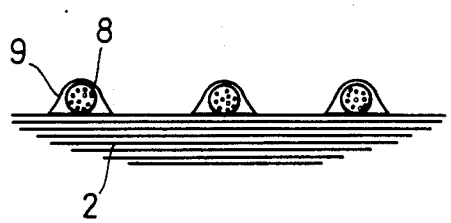
FIG. 4 is an enlarged sectional view of a surface area of the FRP leaf spring body.
Figure 5A:
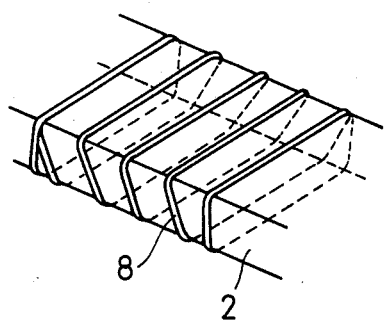
FIGS. 5A and 5B are perspective views of reinforcing fibers wound around the FRP leaf spring body in a spiral and a ring-like shape, respectively.
Figure 5B:
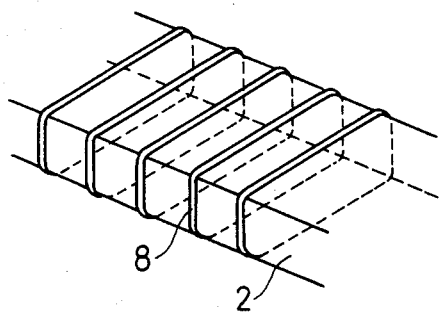
Figure 6:
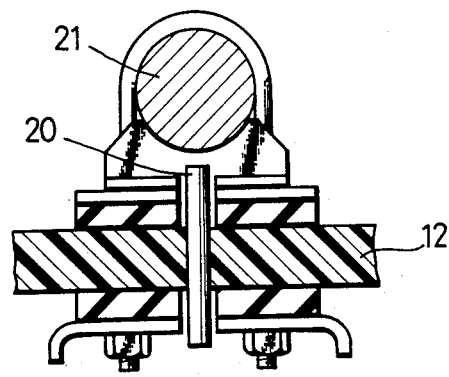
FIG. 6 is a longitudinally sectional view of a central portion of a conventional FRP leaf spring suspension.

Referring now to FIG. 1 which shows a FRP leaf spring suspension 1 of the present invention, reference numerals 2, 3 and 4 designate a FRP leaf spring body having rectangular section, a hat-shaped retainer, and a U bolt seat having opposed flanges, respectively. The FRP leaf spring body 2 is surrounded tightly by a rubber pad 5 at its central portion, and it is interposed between the retainer 3 and the U bolt seat 4. In other words, the retainer 3 and the U bolt seat 4 are disposed on an upper and a lower surface of the rubber pad 5. A spring seat 6 is disposed on an upper surface of the retainer 3. The retainer 3 has an outwardly extending opposite flange 3b formed with holes 3a at free ends thereof, and the U bolt seat 4 also has holes 4a adapted to be mated with the holes 3a. The FRP leaf spring body 2 with the rubber pad 5 is fixed through the spring seat 6 to an axle housing 21 by a U bolt 7 inserted into the holes 3a of the retainer 3 and the holes 4a of the U bolt seat 4. As shown in FIGS. 2 to 5A and 5B, a reinforcing fiber 8 such as glass fiber and carbon fiber impregnated with resin 9 (See expecially FIG. 4) is wound around a surface of the FRP leaf spring body 2 and is fixed thereto to form unevenness on the surface. The reinforcing fiber 8 is wound around the surface of the leaf spring body 2 in a spiral-manner as shown in FIG. 5A, or in a ring-like manner as shown in FIG. 5B. The retainer 3 is provided with a pin 10 on its upper flat portion adapted to be fitted into a hole 6a formed in the spring seat 6.

With this arrangement, an external force from wheels to the FRP leaf spring suspension 1 is transmitted from the axle housing 21 through the spring seat 6, the U bolt seat 4, the retainer 3 and the rubber pad 5 owing to fixing of the U bolt 7 to the FRP leaf spring body 2. Relative positions of such combined elements, that is, the retainer 3, U bolt seat 4 and spring seat 6 are dependent upon the pin 10, the U bolt 7 and the corresponding holes 6a, 3a and 4a, and the combined elements are fixed at the central position of the FRP leaf spring body 2 with the aid of a frictional force between the rubber pad 5 and the FRP leaf spring body 2. As the FRP leaf spring body 2 is surrounded by the reinforcing fiber 8 at its central portion to provide unevenness on the surface of the central portion, a frictional force between the rubber pad 5 and the FRP leaf spring body 2 may be increased, but distributed uniformly on the frictional surface, thereby preventing stress concentration generated on the FRP leaf spring body 2.

Figure 7:
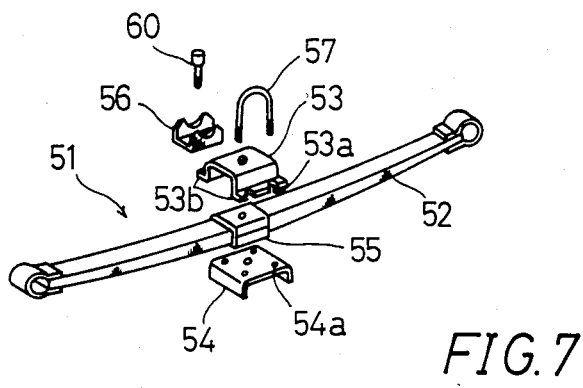
FIG. 7 is a perspective view of the FRP leaf spring suspension with each component disengaged, according to another embodiment of the present invention.
Figure 8:
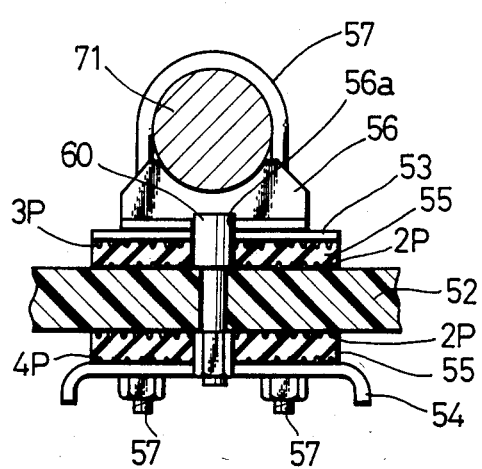
FIG. 8 is a longitudinally sectional view of a central portion of the FRP leaf spring suspension in FIG. 7.
Figure 9:
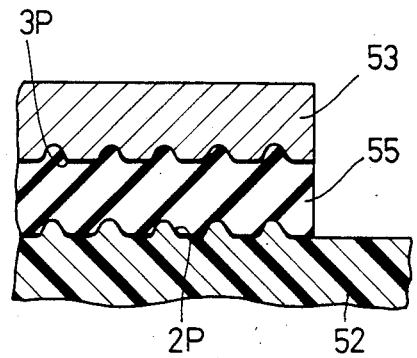
FIG. 9 is an enlarged sectional view of the essential part of FIG. 8.
Figure 10:
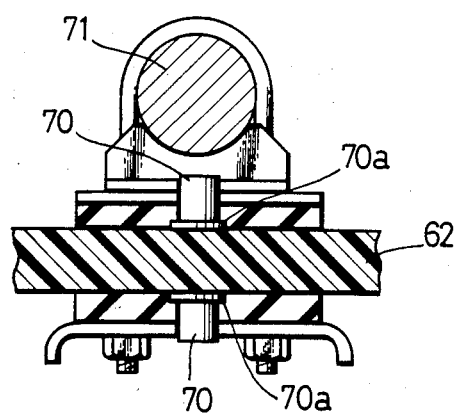
FIG. 10 is a longitudinally sectional view of a central portion of a conventional FRP leaf spring suspension in connection with FIG. 8.

Referring next to FIG. 7 which shows another embodiment of the present invention, reference numerals 51, 52, 53 and 54 designate a FRP leaf spring suspension, a FRP leaf spring body having a rectangular section, a hat-shaped retainer, and a U bolt seat having opposed flanges, respectively. The FRP leaf spring body 52 is surrounded tightly by a rubber pad 55 at its central portion, and they are interposed between the retainer 53 and the U bolt seat 54. In other words, the retainer 53 and the U bolt seat 54 are disposed on an upper and a lower surface of the rubber pad 55. A spring seat 56 is disposed on an upper surface of the retainer 53. The retainer 53 has opposite flanges 53b formed with holes 53a, and the U bolt seat 54 has also holes 54a adapted to be mated with the holes 53a. The FRP leaf spring body 52 with the rubber pad 55 is fixed through the spring seat 56 to an axle housing 71 by a U bolt 57 inserted into the holes 53a of the retainer 53 and the holes 54a of the U bolt seat 54. As shown in FIGS. 8 and 9, the FRP leaf spring body 52 is formed with a stripe-like projection 2P extending in a lateral direction of the leaf spring body 52, or a plurality of dotlike projections on the upper and the lower surface of the leaf spring body 52. In a similar manner, there are formed projections 3P and 4P on a lower surface of the retainer 53 and an upper surface of the U bolt seat 54. Although the center pin 60 is inserted through the FRP leaf spring body 52 in the drawings, a pin (not shown) may be formed on the retainer 53 to fit same into a hole 56a formed in the spring seat 56.

With this arrangement, an external force from wheels to the FRP leaf spring suspension 51 is transmitted from the axle housing 71 through the spring seat 56, the U bolt seat 54, the retainer 53 and the rubber pad 55 owing to fixing of the U bolt 57 to the FRP leaf spring body 52. Relative positions of such combined elements, that is, the retainer 53, U bolt seat 54 and spring seat 56 are dependent upon the center pin 60, the U bolt 57 and the corresponding holes 56a, 53a and 54a, and the combined elements are fixed at the central position of the FRP leaf spring body 52 with the aid of a frictional force between the rubber pad 55 and the FRP leaf spring body 52. As each projection 2P, 3P, 4P is formed on the upper and the lower surface of the central portion of the FRP leaf spring body 52, the lower surface of the retainer 53 and the upper surface of the U bolt seat 54, the frictional forces generated between the leaf spring body 52 and the rubber pad 55 as well as among the rubber pad 55, the retainer 53 and the U bolt seat 54 may be increased, but distributed uniformly on the frictional surfaces therebetween, thus preventing stress concentration from being generated on the leaf spring body 52 around the center pin 60.

Having thus described the preferred embodiments of the invention, it should be understood that numerous structural modifications and adaptations may be restored to without departing from the spirit of the invention.

What is claimed is:

1. In a FRP leaf spring suspension for an automobile including a FRP leaf spring body having a surface surrounded tightly by a rubber pad and interposed between a retainer and a U bolt seat through said rubber pad at its longitudinal central portion, said surface being in frictional contact with said surrounding rubber pad and being fixed through a spring seat disposed on an upper side of said retainer to an axle housing by a U bolt passing through mating holes formed in said retainer and said U bolt seat, an improvement comprising a reinforcing fiber impregnated with resin and wound around said frictional contact surface of said FRP leaf spring body for increasing frictional force between said FRP leaf spring body and said rubber pad, and distributing the frictional force uniformly on said frictional contact surface between said FRP leaf spring body and said rubber pad.

2. The invention as defined in claim 1, wherein said reinforcing fiber is spirally wound around said frictional contact surface of said FRP leaf spring body.

3. The invention as defined in claim 1, wherein said reinforcing fiber is wound in ring-like manner around said frictional contact surface of said FRP leaf spring body.

* * * * *